United States Patent [19]
Hall

[11] Patent Number: 5,588,711
[45] Date of Patent: Dec. 31, 1996

[54] SIDE DUMPING CONTAINER

[75] Inventor: Daniel J. Hall, Voorbaai, South Africa

[73] Assignee: John Daniel Containers (Proprietary) Limited, George, South Africa

[21] Appl. No.: 404,875

[22] Filed: Mar. 16, 1995

[30] Foreign Application Priority Data

Mar. 16, 1994 [ZA] South Africa ............................ 94/1833
Jun. 3, 1994 [ZA] South Africa ............................ 94/3913

[51] Int. Cl.$^6$ .................................................. B65D 88/54
[52] U.S. Cl. .............................. 298/18; 298/1 B; 414/470
[58] Field of Search ............................ 414/470; 298/1 B, 298/7, 18

[56] References Cited

U.S. PATENT DOCUMENTS

| | | |
|---|---|---|
| 1,279,089 | 9/1918 | Dolbear . |
| 1,897,175 | 2/1933 | Meyer . |
| 2,284,661 | 6/1942 | Joy . |
| 2,471,874 | 5/1949 | Johns . |
| 3,616,950 | 11/1971 | Coons . |
| 3,837,516 | 9/1974 | Meyer . |
| 4,049,137 | 9/1977 | Meyer . |
| 4,129,222 | 12/1978 | Richardsson . |
| 4,314,788 | 2/1982 | Williams et al. ............... 298/1 B |

FOREIGN PATENT DOCUMENTS

| | | | |
|---|---|---|---|
| 0125115 | 11/1984 | European Pat. Off. . | |
| 462789 | 4/1951 | Italy ................................ | 414/470 |
| 136627 | 10/1980 | Japan ............................... | 298/1 B |
| 1368207 | 1/1988 | U.S.S.R. .......................... | 298/1 B |
| 1511550 | 5/1978 | United Kingdom . | |

*Primary Examiner*—David A. Bucci
*Assistant Examiner*—Gregory A. Morse
*Attorney, Agent, or Firm*—Greenlee, Winner and Sullivan, P.C.

[57] ABSTRACT

A container 10 for use in the transportation of goods mounted or mountable on a load carrying vehicle 12. The container 10 includes a floor 18 and a pair of opposed side walls 20, 22 each of which is supported for displacement about a pivotal axis adjacent its upper edge. The side wall 20 is hingedly connected adjacent its lower edge to the floor 18. The container 10 includes displacement means 16 for displacing the floor 18 and the side walls 20, 22 between a rest position in which goods can be contained within the container and a discharge position in which goods contained within the container can be discharged therefrom. In addition, the container 10 includes friction reducing floor support means in the form of rollers supporting the floor 18 to facilitate displacement thereof between its rest and discharge positions.

16 Claims, 8 Drawing Sheets

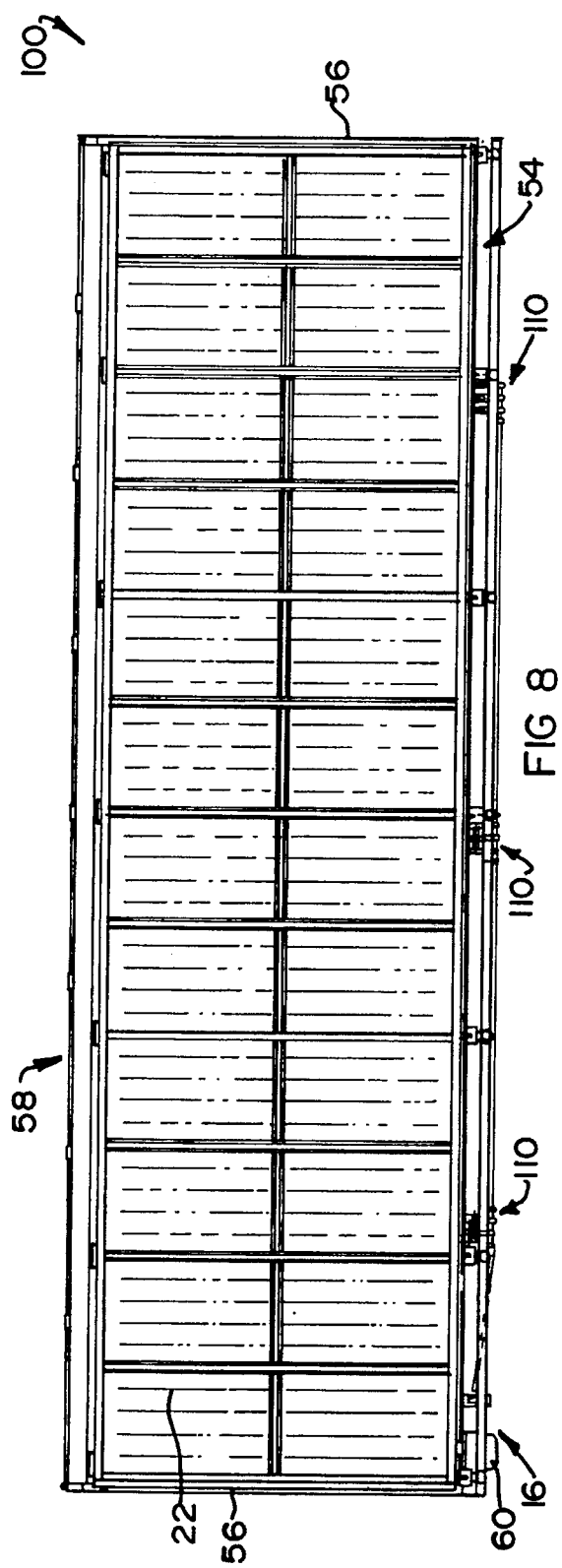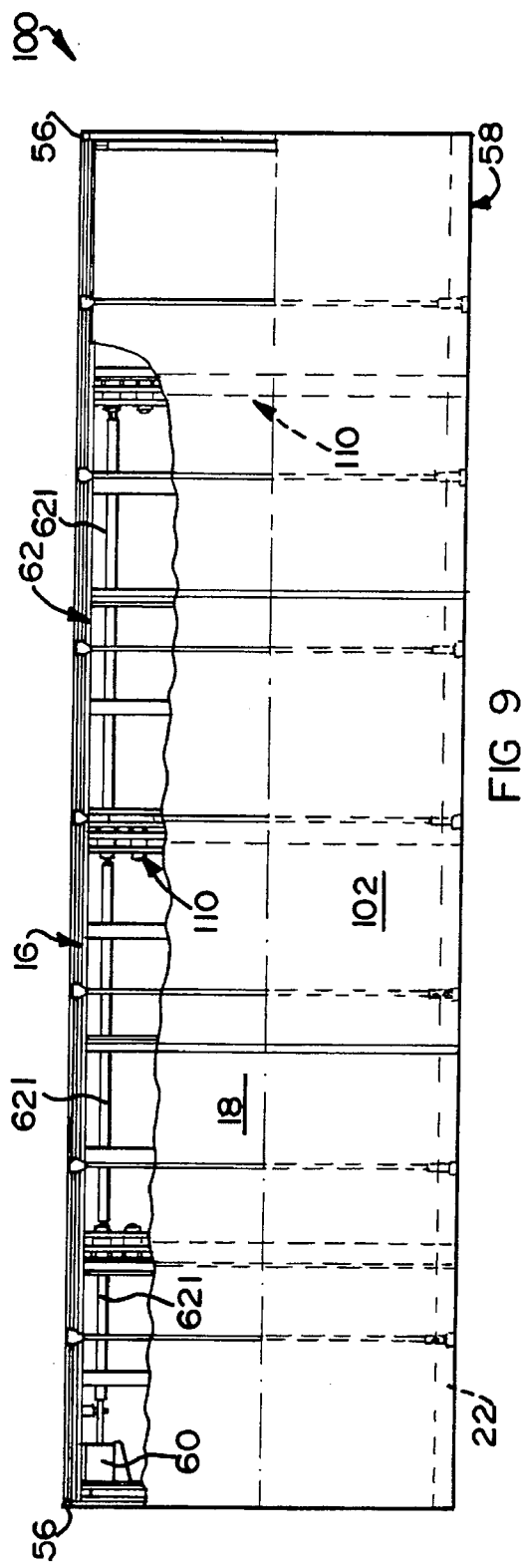

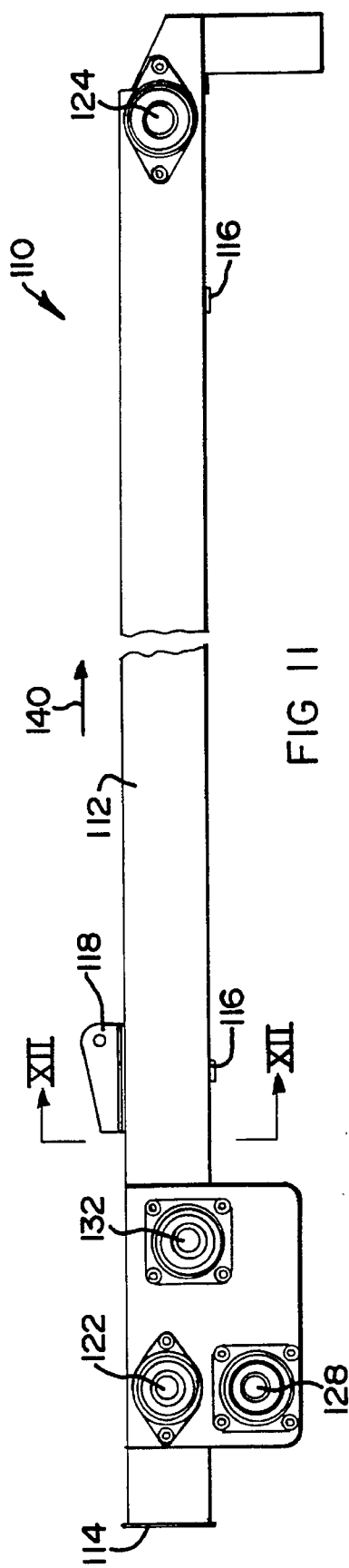
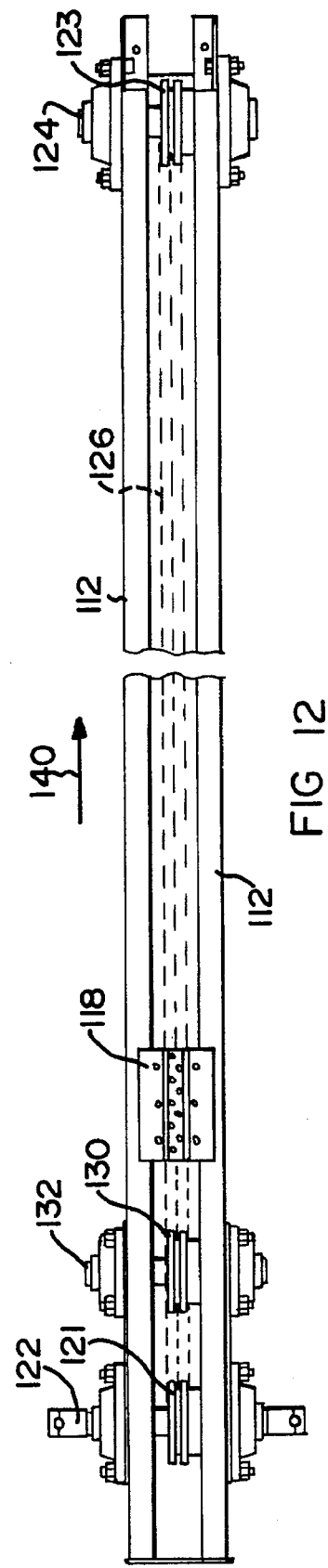
FIG 11
FIG 12

SIDE DUMPING CONTAINER

BACKGROUND OF THE INVENTION

This invention relates to the transportation of goods. More particularly it relates to a container and to a load carrying vehicle.

SUMMARY OF THE INVENTION

According to one aspect of the invention there is provided a container for use in the transportation of goods, which container is mounted or mountable on a load carrying vehicle and includes a floor;

a pair of opposed side walls each of which is supported for displacement about a pivotal axis adjacent its upper edge and one of which is hingedly connected adjacent its lower edge to the floor;

displacement means for displacing the floor and at least said one side wall between a rest position in which goods can be contained within the container and a discharge position in which goods contained within the container can be discharged therefrom; and friction reducing floor support means supporting the floor to facilitate displacement thereof between its rest and discharge positions.

The floor support means may include a plurality of rollers positioned to support the floor.

The floor support means may include a plurality of parallel spaced apart tracks on which the rollers run, the rollers and tracks being positioned underneath the floor.

Typically the rollers will be connected to the floor and the tracks will be fixed to a support. The support on which the tracks are supported may form an integral part of the container e.g. it may be a base frame. Instead, the support may be part of the load carrying vehicle. Each roller may have an annular recess therein within which a portion of the associated track is receivable to locate the roller laterally relative to the track.

According to another aspect of the invention there is provided a container for use in the transportation of goods, which container is mounted or mountable on a load carrying vehicle and includes a floor;

a pair of opposed side walls each of which is supported for displacement about a pivotal axis adjacent its upper edge and one of which is hingedly connected adjacent its lower edge to the floor; and displacement means for displacing the floor and at least said one side wall between a rest position in which goods can be contained within the container and a discharge position in which goods contained within the container can be discharged therefrom, the displacement means including a drive member positioned underneath the floor and at least one elongate flexible element drivingly connecting the drive member to the floor.

In one embodiment of the invention the elongate flexible element may be an endless chain which is drivingly connected to the floor. The chain may extend around a drive sprocket and a driven sprocket spaced from the drive sprocket, the drive member being drivingly connected to the drive sprocket.

The displacement means may include a connecting element connected to and extending between the chain and the floor.

In another embodiment of the invention, the displacement means may include a pulley arrangement to which the drive member is drivingly connected for displacing the elongate flexible element, e.g. in the manner of a winch, and hence also the floor.

In one embodiment of the invention the drive member may be electrically operated, e.g. it may be an electric motor.

In another embodiment of the invention the drive member may be operated by a pressurised fluid, e.g. it may be in the form of a pneumatic or hydraulic piston and cylinder assembly.

In yet another embodiment of the invention the drive member may be mechanically operated.

In the rest position the floor and said one side wall may be perpendicular, and in the discharge position the angle defined between the floor and said one side wall may be greater than 90° with the being inclined downwardly from its connection with said one side wall to facilitate discharge of goods from the container.

In a preferred embodiment of the invention, in the discharge position the floor and said one side wall together form an inclined slide to further facilitate discharge of goods from the container.

The floor is typically square or rectangular with four walls extending upwardly from the floor in opposed pairs when the floor is in its rest position, the side wall which is positioned opposite said one side wall being displaceable simultaneously with the floor and said one wall between a rest position in which it extends upwardly from the floor, and a displaced position in which at least a lower edge of the side wall opposite said one side wall is displaced away from the floor to form a discharge opening therebetween and facilitate discharge of goods from the container.

The opposite side wall may be linked to at least one of the floor and said one side wall for displacement simultaneously therewith between its rest and displaced positions. The opposite side wall may be linked to said one side wall by means of at least one elongate strut which is pivotally connected at its ends to the side walls.

According to yet another aspect of the invention there is provided a container for use in the transportation of goods which container is mounted or mountable on a load carrying vehicle and includes a floor having four sides with adjacent sides being generally perpendicular; and a pair of opposed side walls and a pair of opposed end walls extending upwardly from respective sides of the floor, the side walls being supported for pivotal displacement about pivot axes positioned adjacent the upper edges of the respective side walls, one of the side walls being hingedly connected adjacent its lower edge to the floor so that the floor and at least said one side wall are displaceable between a rest position in which goods can be contained within the container, and a discharge position in which goods contained within the container can be discharged therefrom, at least part of at least one of the end walls adjacent said one side wall being displaceable simultaneously with the floor and said one side wall between the rest position and the displaced position.

At least part of each of the end walls adjacent said one side wall may be displaceable simultaneously with the floor and said one side wall.

Each of the end walls may include a fixed portion and a displaceable portion, the fixed portion being fixed to a support, e.g. the chassis of the vehicle or a base of the container, and the displaceable portion being connected to one of the floor and said one side wall for displacement simultaneously therewith, the portions of the end walls being configured such that in the rest position they overlap to form closed walls for the container.

The moveable parts of the end walls adjacent said one side wall may be connected to said one side wall.

The side wall positioned opposite said one side wall may be displaceable simultaneously with the floor and said one side wall between a rest position in which it extends upwardly from the floor, and a displaced position in which at least a lower edge of the side wall is displaced away from the floor to form a discharge opening therebetween and facilitate discharge of goods from within the container.

The side wall which is opposite said one side wall may be pivotally displaceable about a pivot axis positioned adjacent its upper edge. The opposite and said one side wall for displacement between its rest and displaced positions simultaneously therewith.

The container may form an integral part of said vehicle.

Instead, the container may be dismountably mountable on said vehicle and include locking formations configured to cooperate with the complementary locking formations on the vehicle to retain the container releasably in position on the vehicle. The locking formations will typically be the conventional locking formations presently used on bulk transportation containers thereby permitting a container in accordance with the invention to be used together with existing bulk container handling equipment.

The container may be self-contained. Hence, the container may include a power source for operating the displacement means.

According to a further aspect of the invention there is provided a load carrying vehicle which includes a chassis; and a container as described above mounted on the chassis.

The vehicle may be in the form of a motor vehicle or a trailer for a motor vehicle. Instead, the vehicle may be in the form of a railway wagon.

BRIEF DESCRIPTION OF THE DRAWINGS

The invention will now be described, by way of example, with reference to the accompanying diagrammatic drawings.

In the drawings,

FIG. 8 shows a side view of yet another container for transporting goods in accordance with the invention;

FIG. 9 shows a plan view of the container of FIG. 8 with part of the roof and part of the floor omitted;

FIG. 11 shows, on an enlarged scale, part of the displacement means for displacing the components of the container between their rest and discharge positions;

FIG. 12 shows a plan view of the part of the displacement means shown in FIG. 11;

DESCRIPTION OF THE PREFERRED EMBODIMENTS

Figure 1:
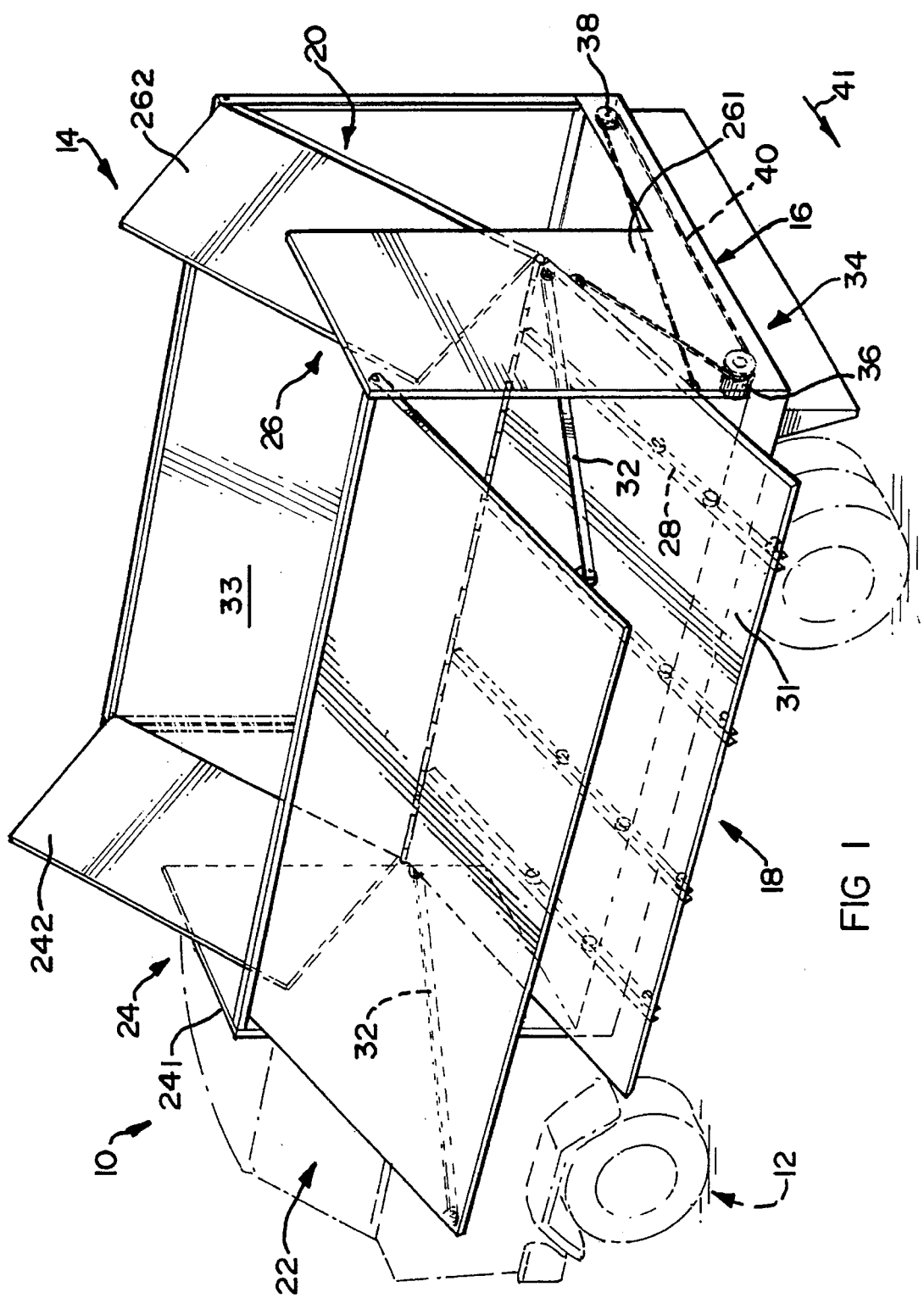
FIG. 1 shows a three-dimensional view of a load carrying vehicle in accordance with the invention with its load carrying container in a discharge position.
Figure 2:
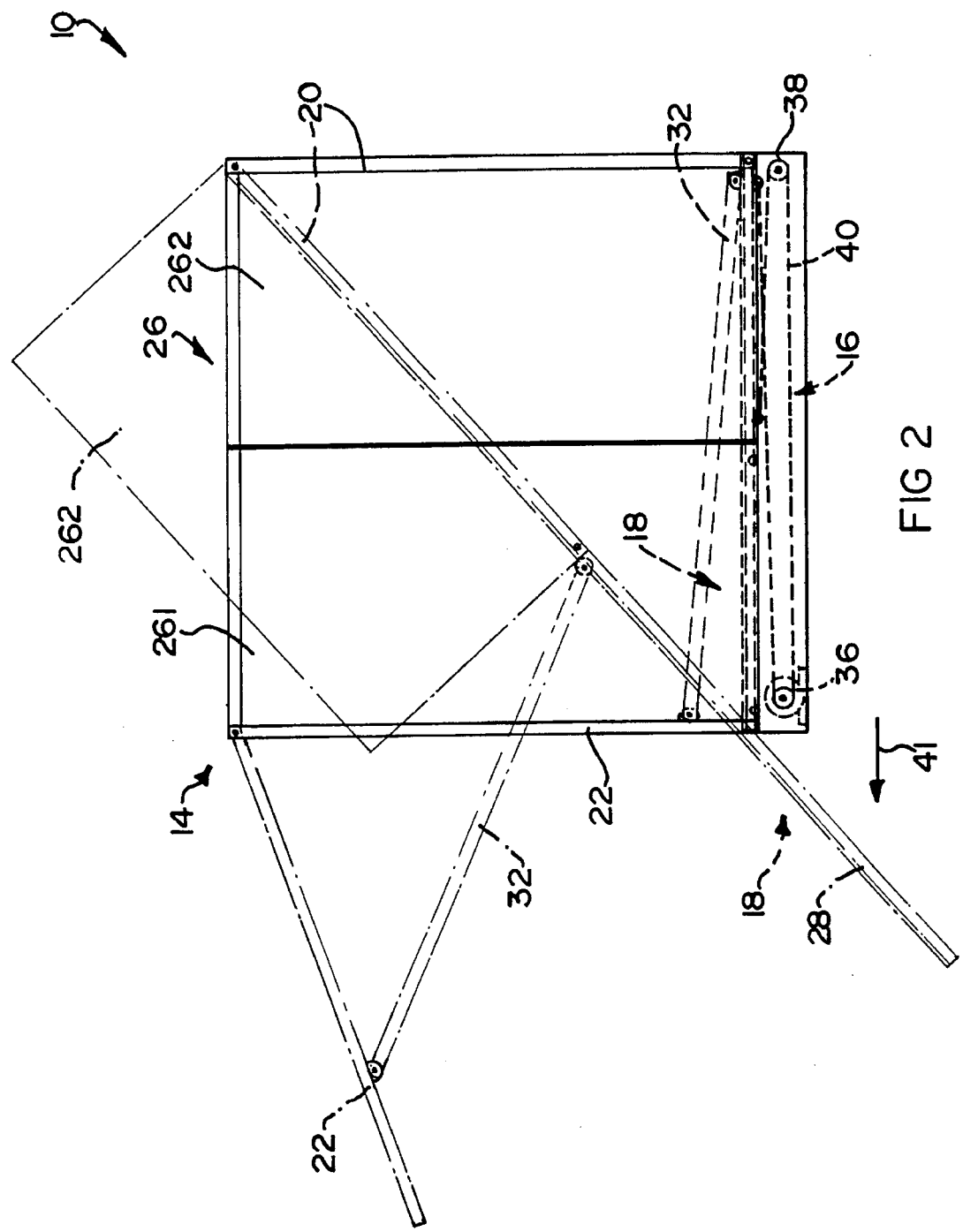
FIG. 2 shows a rear view of the load carrying container.

In FIGS. 1 to 4 of the drawings, reference numeral 10 refers generally to a load carrying vehicle in accordance with the invention. The vehicle 10 comprises a wheeled chassis, generally indicated by reference numeral 12 and a load-carrying container, generally indicated by reference numeral 14 mounted on the chassis 12. The vehicle 10 further includes displacement means, generally indicated by reference numeral 16, for displacing parts of the container 14 between a rest position (shown in FIG. 3) and a discharge position (shown in FIGS. 1 and 2) as described in more detail herebelow.

Figures 3, 4:
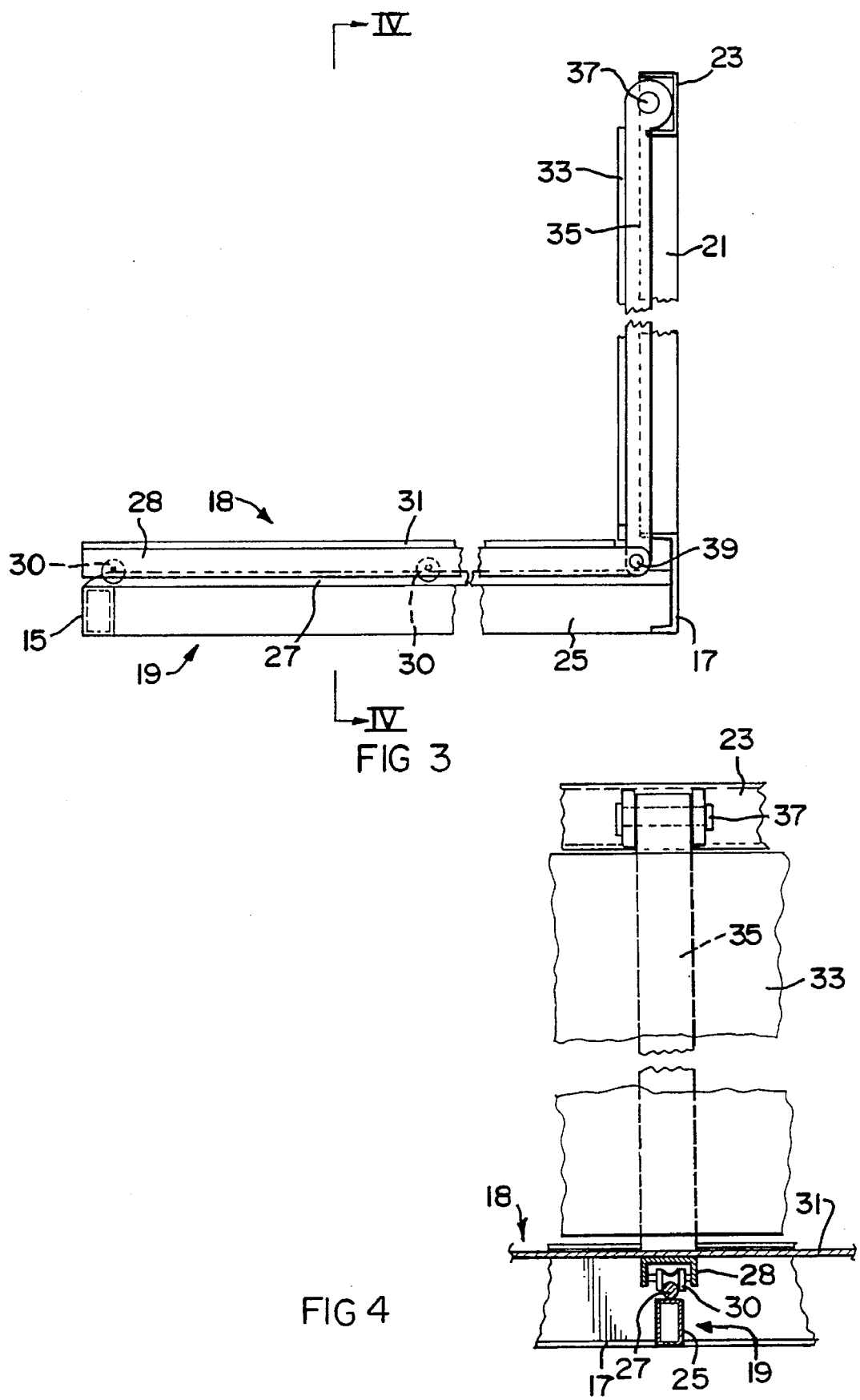
FIG. 3 shows an end view of the floor and a side wall of the load carrying container forming part of the load carrying vehicle of FIG. 1, in a rest position with certain details being omitted for the sake of clarity.
FIG. 4 shows a sectional elevation taken at IV—IV in FIG. 3.

The container 14 includes a base frame which is mounted on the chassis 12 and which comprises transversely spaced apart parallel longitudinally extending side members 15, 17 (FIG. 3). The side member 15 is in the form of a box section and the side member 17 is in the form of a channel member. A plurality of transversely extending guide rails, generally indicated by reference numeral 19 (FIGS. 3 and 4), are connected to and extend transversely between the side members 13, 15. A plurality of longitudinally spaced apart vertically extending support posts 21 are connected to and extend vertically upwardly from the side member 17. A longitudinally extending connecting member 23 is connected to the upper ends of the support posts 21. Each of the guide rails 19 comprises a length of box section 25 and a rod 27 attached to an upper surface of the box section 25. The lengths of box section 25 are secured, e.g. by welding, to the side members 15, 17, and hence form part of the base frame.

The container 14 comprises a rectangular floor 18, a pair of side walls 20, 22 which, in the load-carrying or rest position of the container extend vertically upwardly from opposed sides of the floor 18, and a pair of end walls, namely, a front wall 24 and a rear wall 26.

The side walls 20 and 22 are mounted for pivotal displacement about pivotal axes which extend adjacent with and parallel to their upper edges. The floor 18 is pivotally connected at its one edge to the lower end of the side wall 20.

The floor 18 is of composite construction and comprises a rectangular floor panel 31 to which a plurality of transversely extending channels 28 is mounted at longitudinally spaced apart positions. A pair of waisted rollers 30 is mounted on each channel 28 the rollers 30 in each pair being at longitudinally spaced apart positions such that, with the floor in its rest or horizontal position the rollers 30 rest on the rods 27.

The side wall 20 is also of composite construction comprising a wall panel 33 to which a plurality of channel elements 35 is connected such that the channel elements 35 are parallel and longitudinally spaced apart. The channel elements 35 are pivotally connected via pivot pins 37 at their upper ends to the connecting member 23. The lower ends of the channel elements 35 are connected via pivot pins 39 to the one ends of the channels 28 so that the floor 18 is pivotally connected to the side wall 20.

The front wall 24 includes a fixed portion 241 which is secured to the base frame or the chassis 12 and extends upwardly therefrom, and a displaceable portion 242 which is connected to the side wall 20. Similarly, the rear wall 26 comprises a fixed portion 261 which is fixed to the base frame or the chassis 12 and a displaceable portion 262 which is fixed to the side wall 20.

A pair of elongate struts 32 are connected to and extend between the floor 18 and the side wall 22, each strut being pivotally connected at its ends respectively to the floor 18 and side wall 22. The side wall 22 is pivotally connected towards its upper edge to the fixed portions 241 and 261 of the front wall 24 and rear wall 26, respectively.

The displacement means 16 includes a pair of winch assemblies, one of which is generally indicated by reference numeral 34 in FIG. 1. Each winch assembly 34 includes a winch 36 which is mounted on the chassis 12 and a pulley 38 which is mounted on the chassis 12 at a position spaced transversely from the winch 36. An elongate flexible element 40, e.g. in the form of a cable or a length of webbing, extends around the winch 36 and the pulley 38, with the ends of the flexible element 40 being connected to the floor 18 at spaced apart positions.

In use, in its load-carrying condition, the floor 18, side walls 20, 22, front wall 24 and rear wall 26 together define a generally box shaped load-carrying compartment within which a load can be transported.

When the vehicle 10 reaches its destination and it is desired to discharge the load from within the load-carrying container 14, the winch 36 is activated which causes the floor 18 to be displaced transversely in the direction of arrow 41. This in turn causes the side wall 20 to pivot about its associated pivotal axis resulting in the angle defined between the floor 18 and side wall 20 increasing. Simultaneously, by virtue of the struts 32, the lower edge of the side wall 22 is also displaced upwardly and outwardly so that the space between its lower edge and the floor 18 increases progressively. The displaceable portions 242, 262 of the front and rear walls 24, 26, respectively are also displaced simultaneously with the side wall 20.

When the displaceable components of the container 14 are in their fully displaced or discharge position (shown in FIG. 1 and in broken lines in FIG. 2) the side wall 22 is spaced from the floor 18 to define a discharge opening and the floor 18 and side wall 20 together form an inclined ramp which serves to discharge the contents of the container therefrom and the lower edge of the floor 18 protrudes transversely from the chassis 12.

When the contents of the load-carrying container 14 have been discharged, the winch 36 is operated in the reverse direction, so as to return the floor 18, side walls 20, 22 and displaceable portions 24.2, 26.2 of the front and rear walls 24, 26 to their rest or load-carrying positions.

The Applicant believes that a load-carrying vehicle 10 in accordance with the invention will be particularly suitable for use in carrying wood chips, sugar cane or bagasse. The Applicant further believes that the vehicle will be suitable for transporting minerals such as coal and the like. However, it is to be appreciated that the vehicle 10 with, or without modification may be used for carrying other goods.

In the embodiment shown in the drawings, the chassis is in the form of a truck chassis. However, it is to be appreciated that the chassis could be the chassis of any other type of load carrying vehicle, e.g. a trailer, a railway truck or the like.

The Applicant believes that an advantage of a load-carrying vehicle 10 in accordance with the invention is that by virtue of the fact that in its displaced or discharge position, the lower edge of the floor 18 protrudes a substantial distance beyond the side of the chassis 12 and hence the wheels of the chassis, goods such as wood chips are discharged well clear of the chassis and not between the wheels of the vehicle 10. In addition, the Applicant believes that by making use of the winch 36 to displace the floor 18, side walls 20, 22 and displaceable portions 242, 262 of the front and rear walls 24, 26 a relatively cost effective and reliable arrangement is obtained. The winch 36 will typically be powered from the vehicles electrical system. A further advantage in that the provision of the rollers 30 and tracks or rods 27 serves both to support and guide the floor 18 and reduce the force required to displace the floor 18 from its rest to its displaced position thereby maximizing the load that can be transported. Still another advantage of a load-carrying vehicle 10 in accordance with the invention is that, as a result of the displacement of the displaceable portions 242 and 262 of the front and rear walls 24, 26, respectively, the risk that wood chips or other similar types of material being transported, could become wedged between the floor 18 and the front and rear walls 24, 26 and/or the side wall 20 and the front and rear walls 24, 26 is reduced. This results in enhanced reliability and less down time.

It is to be appreciated, that the load carrying container 14 could be formed as an independent unit which is dismountably mountable on a complementary chassis of a load carrying vehicle. The container 14 would then typically include locking means for cooperation with complementary locking means on the chassis whereby the container is releasably lockable in position on the chassis of the vehicle.

Figure 5:
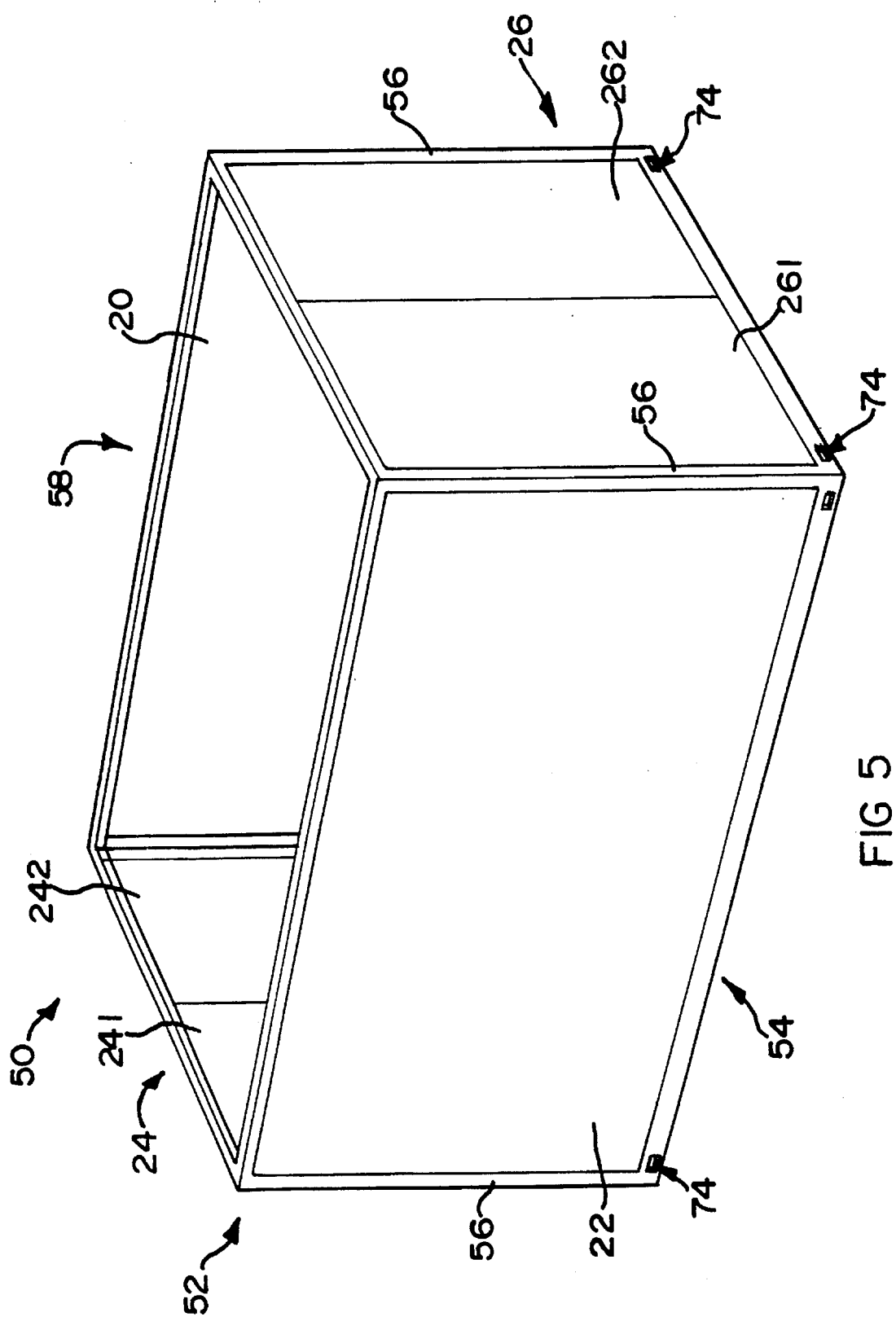
FIG. 5 shows a three-dimensional view of a container for transporting goods in accordance with the invention.
Figure 6:
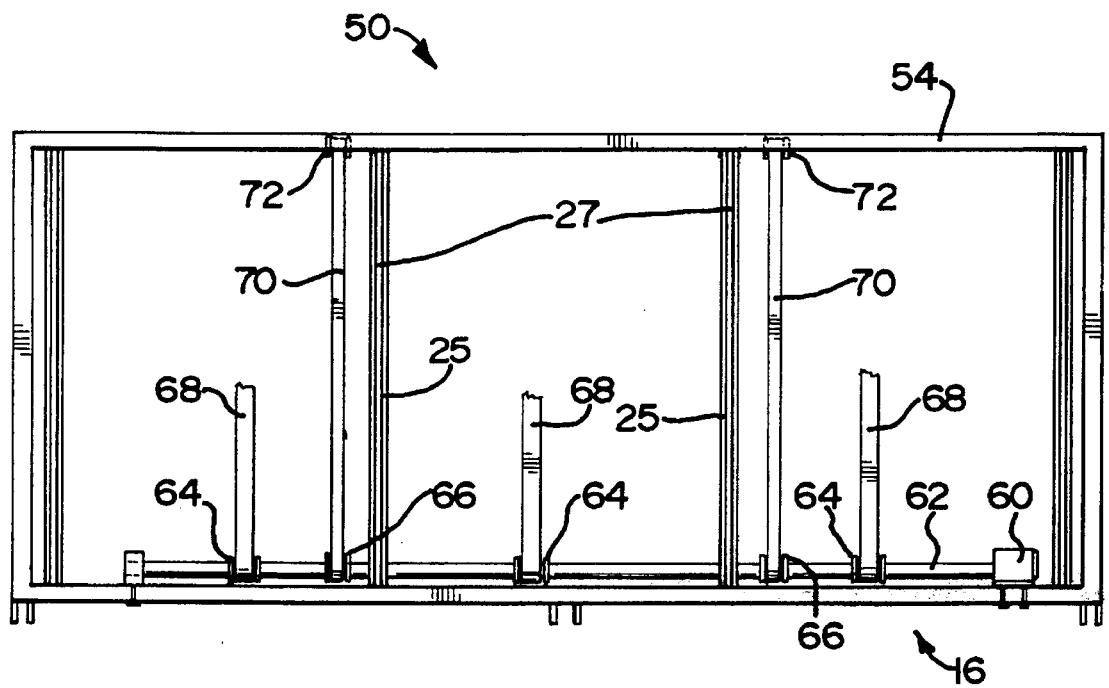
FIG. 6 shows a plan view of the container of FIG. 5 with the floor and walls omitted.
Figure 7:
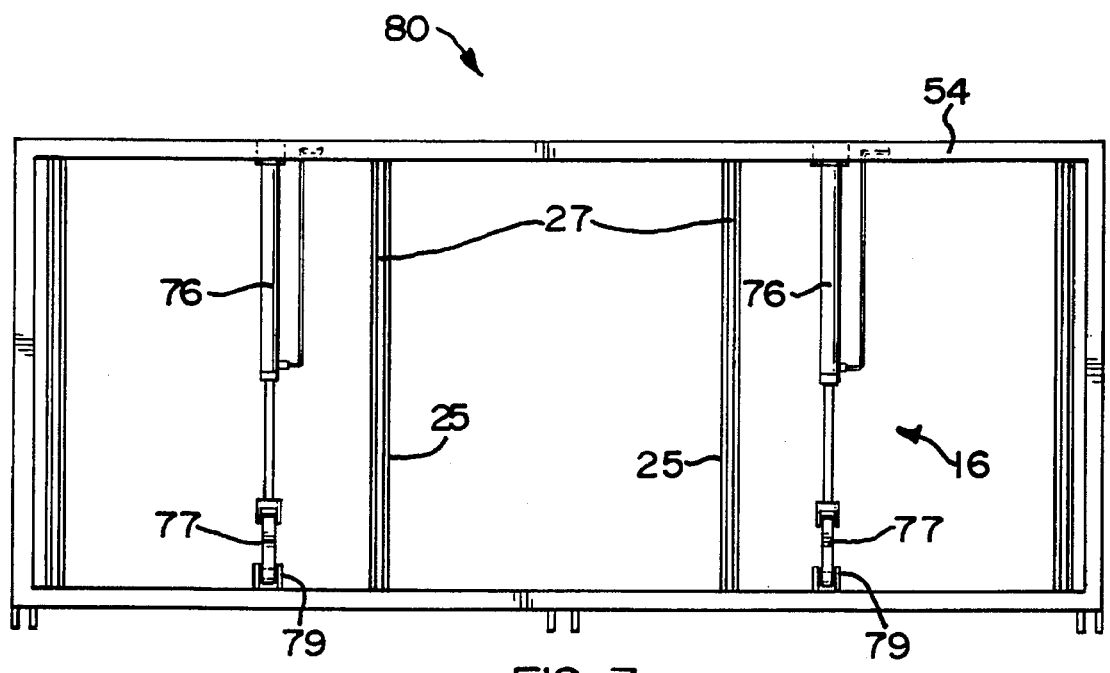
FIG. 7 shows a plan view similar to FIG. 6 of another container in accordance with the invention.
Figure 10:
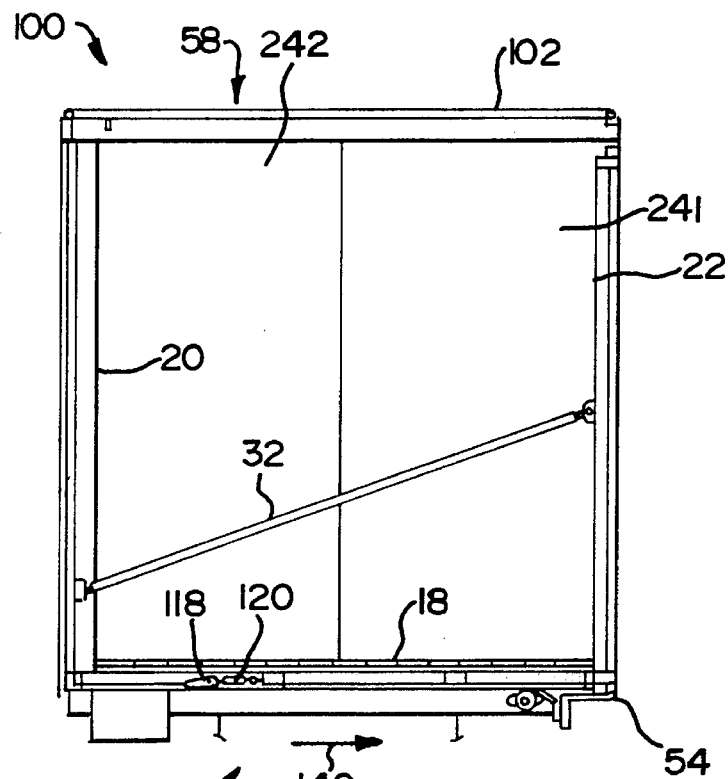
FIG. 10 shows an end view of the container of FIGS. 8 and 9 with an end wall omitted.
Figure 13:
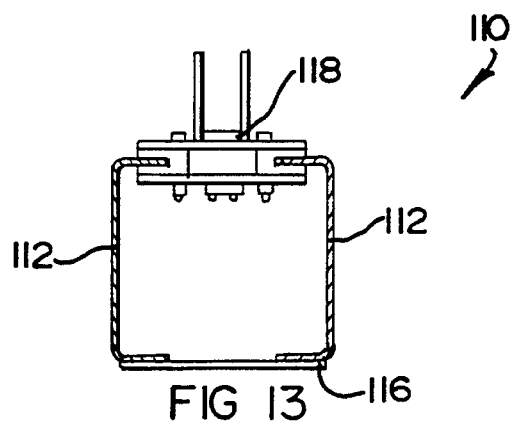
FIG. 13 shows a sectional elevation taken at XIII—XIII in FIG. 11.

Reference is now made to FIGS. 5 to 7 of the drawings, in which reference numeral 50 refers generally, to a container in accordance with the invention. Unless otherwise indicated, the same reference numerals used above with reference to FIGS. 1 to 4 of the drawings, are to designate similar components.

The container 50 includes a frame 52. The frame 52 comprises a rectangular base frame 54 and four upright members 56 connected to and protruding upwardly from the corners of the base frame 54 and a rectangular upper frame 58 which is connected to the upper ends of the upright members 56. The side wall 20 is connected to the upper frame 58 by means of pivot pins 37 in the manner described above. Similarly, the side wall 22 is pivotally connected to the upper frame 58.

As can be seen in FIG. 6 of the drawings, the displacement means 16 includes a drive member in the form of an electric motor 60 mounted on the base frame 54 and drivingly connected to a shaft 62. Three primary pulleys 64 and two secondary pulleys 66 are mounted on the shaft 61 at longitudinally spaced apart positions. An elongate flexible element 68, e.g. in the form of a length of webbing, is wound around each of the primary pulleys 64 with a free end of the flexible element 68 being connected to the floor (not shown in FIG. 6 of the drawings) of the container 50 at a position adjacent the pivotal connection of the floor 18 to the side wall 20.

An elongate flexible element 70, e.g. in the form of a length of webbing, is wound around each of the secondary pulleys 66 with the flexible element 70 protruding from the secondary pulley 66 across the base frame 54, around a return pulley 72, mounted on the opposite side of the base frame 54 to the secondary pulley 66, with its free end being connected to the floor 18 at a position spaced from its pivotal connection to the side wall 20.

In use, the container 50 is mounted on a load carrying vehicle, e.g. on the load bed of a truck. The container 50 may have dimensions which correspond to the standard dimensions of bulk transportation containers and have complementary mounting and/or locking formations 74 (FIG. 5) whereby the container 50 is releasably lockable on the load bed of a container carrying vehicle.

In use, a load contained within the container 50 is discharged therefrom in the identical manner to that described above with reference to FIGS. 1 to 4 of the drawings. Hence, by energising the electric motor 60 and rotating the shaft 62 in one direction, the flexible elements 68 can be wound onto the primary pulleys 64 thereby displacing the floor 18 side walls and movable portions of the front and rear walls towards their displaced position. Rotating the shaft 62 in this direction causes the flexible elements 70 to unwind from the secondary pulleys 66. When it is desired to return the components of the container 50 to their closed or load carrying condition, the electric motor 60 is energised and the shaft 62 is rotated in the opposite direction so that the flexible elements 70 are wound onto the secondary pulleys 66 and the flexible elements 68 are unwound from the primary pulleys 64.

As illustrated in FIG. 7 of the drawings, in which reference numeral 80 refers generally to another container in accordance with the invention, instead of making use of the electric motor 60, use could be made of one or more pressurised fluid operated piston and cylinder assemblies 76 each of which is drivingly connected to the floor 18 via a flexible element, e.g. a length of webbing 77 extending around a pulley 79 to displace the floor 18 and other movable components of the container 50 between their closed or load carrying position and their open or discharge position.

Reference is now made to FIGS. 8 to 13 of the drawings, in which reference numeral 100 refers generally to part of yet another container in accordance with the invention and, unless otherwise indicated, the same reference numerals used above are used to designate similar components.

For the sake of brevity and clarity of description, only those features of the container 100 which differ from the containers described above will be described in detail.

The container 100 includes a roof or cover 102 which is displaceable between a closed position (shown in the drawings) in which it covers the contents of the container, and an open position (not shown) in which it permits loading of the container.

In addition, instead of being connected to the floor 18, the one end of the strut 32 is connected to the side wall 20 with the other end of the strut being connected to the side wall 22. However, the strut 32 functions in exactly the same manner to displace the side wall 22 between its rest and displaced positions.

Figure 14:
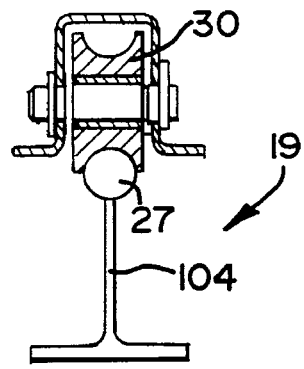
FIG. 14 shows, on an enlarged scale, a sectional elevation of a roller-track arrangement forming part of the container of FIG. 8.

As can best be seen in FIG. 14 of the drawings, the track or guide rail 19 includes an inverted T-section 104 to which the rod 27 is connected. As mentioned above, the guide rail 19 could be mounted on the chassis of a vehicle or it could form an integral part of the container.

The displacement means 16 of the container 100 comprises an electric motor 60 drivingly connected to a shaft 62 which comprises a plurality of segments 621.

The displacement means 16 further includes a plurality of guides, generally indicated by reference numeral 110. As can best be seen in FIGS. 11 and 12 of the drawings, each guide 110 comprises a pair of parallel spaced apart inwardly facing channel members 112. An end cap 114 (FIG. 11) is connected, e.g. by welding, to the one end of the channels 112. A plurality of longitudinally spaced apart connecting members 116 is connected, e.g. by welding, to the operatively lower sides of the channel members 112 to retain them in the desired positions. A slide 118 is slidably mounted on and between the uppermost flanges of the channel members 112 such that it protrudes upwardly therefrom. A push rod 120 (FIG. 10) is pivotally connected at its ends to and extends between the slide 118 and the floor 18.

A drive sprocket 121 is mounted on a shaft 122 between the channel members 112. The electric motor 60 is drivingly connected to the shaft 122. An idler sprocket 123 is mounted on a shaft 124 such that it too is between the channel members 112. An endless chain 126 extends around the drive sprocket 121 and the idler sprocket 123 with the uppermost chain run being positioned between the channel members 112 and the lower chain run being positioned below the channel members 112. A guide sprocket (not shown) is mounted on a shaft 128 immediately below the drive sprocket 121 so as to guide the chain 126. An adjusting sprocket 130 is mounted on a shaft 132 and is positioned between the channel members 112 to engage the chain 126 and permit the tension thereof to be adjusted. The slide 118 is drivingly connected to the upper run of the chain 126 and hence, the slide 118 and push rod 120 together drivingly connect the chain 126 to the floor 18.

In use, when it is desired to discharge goods contained within the container, the electric motor 60 is energised to drive the sprockets 121 and hence displace the upper runs of the chains and the slides 118 in the direction of arrow 140 thereby displacing the floor 18 and side walls 20, 22 as well as the movable portion of the front and rear walls to their displaced positions thereby to discharge the contents of the container therefrom. When it is desired to return the floor 18, side walls 20, 22 and movable portions 242 and 262 of the front wall 24 and rear wall 26 to their rest positions, the electric motor 60 is driven in the reverse direction which causes the slides 118 to be displaced in a direction opposite to the direction of arrow 140 thereby returning the various components of the container to their rest position.

The Applicant believes that the displacement means of the container 100 will be robust and compact which, together with the fact that the floor 18 is supported via the rollers 30 and the guide rails 19 will permit relatively heavy loads to be contained within the container and discharged therefrom in the manner described.

It is to be appreciated, however, that any other arrangement for displacing the movable components of the container between their load carrying and discharged conditions could be used.

I claim:

1. A container for use in the transportation of goods, which container is mountable on a load carrying vehicle and includes a floor;

a pair of opposed side walls each of which is supported for displacement about a pivotal axis adjacent its upper edge and one of which is hingedly connected adjacent its lower edge to the floor;

displacement means for displacing the floor and at least said one side wall between a rest position in which goods can be contained within the container and a discharge position in which goods contained within the container can be discharged therefrom; and friction reducing floor support means supporting the floor to facilitate displacement thereof between its rest and discharge positions, the friction reducing floor support means including a plurality of longitudinally spaced apart transversely extending tracks and longitudinally spaced apart sets of rollers which run on the tracks.

2. A container as claimed in claim 1, in which each set of rollers includes at least two transversely spaced apart rollers which run on a common track.

3. A container as claimed in claim 1, in which each of the rollers is rotatable about a longitudinally extending axis and has a circumferential recess therein within which a portion of a track is receivable so as to locate the rollers laterally relative to the track.

4. A container as claimed in claim 1, which forms an integral part of said vehicle.

5. A container as claimed in claim 1, which is dismountably mountable on said vehicle and includes locking formations configured to cooperate with complementary locking formations on the vehicle to retain the container releasably in position on the vehicle, the container including a power source for operating the displacement means thereby rendering it operable independently of a said vehicle.

6. A container for use in the transportation of goods, which container is mountable on a load carrying vehicle and includes a floor;

a pair of opposed side walls each of which is supported for displacement about a pivotal axis adjacent its upper edge and one of which is hingedly connected adjacent its lower edge to the floor; and displacement means for displacing the floor and at least said one side wall between a rest position in which goods can be contained within the container and a discharge position in which goods contained within the container can be discharged therefrom, the displacement means including a drive member positioned underneath the floor and at least one elongate flexible element drivingly connecting the drive member to the floor, the flexible element being placed in tension when the floor is displaced from its rest position towards its discharge position and when the floor is returned from its discharge position towards its rest position.

7. A container as claimed in claim 6, in which the elongate flexible element is an endless chain which is drivingly connected to the floor.

8. A container as claimed in claim 6, in which the displacement means includes a pulley arrangement to which the drive member is drivingly connected for displacing the elongate flexible element.

9. A container as claimed in claim 6, in which the drive member is electrically operated.

10. A container as claimed in claim 6, in which the drive member is operated by a pressurised fluid.

11. A container as claimed in claim 6, in which the drive member is mechanically operated.

12. A container as claimed in claim 6, which forms an integral part of said vehicle.

13. A container as claimed in claim 6, which is dismountably mountable on said vehicle and includes locking formations configured to cooperate with complementary locking formations on the vehicle to retain the container releasably in position on the vehicle, the container including a power source for operating the displacement means thereby rendering it operable independently of a said vehicle.

14. A container for use in the transportation of goods which container is mountable on a load carrying vehicle and includes a floor having four sides with adjacent sides being generally perpendicular; and a pair of opposed side walls and a pair of opposed end walls extending upwardly from respective sides of the floor, the side walls being supported for pivotal displacement about pivot axes positioned adjacent the upper edges of the respective side walls, one of the side walls being hingedly connected adjacent its lower edge to the floor so that the floor and at least said one side wall are displaceable between a rest position in which goods can be contained within the container, and a discharge position in which goods contained within the container can be discharged therefrom, each of the end walls includes a fixed panel and a displaceable panel positioned longitudinally inwardly of the fixed panel and connected to said one side wall and configured such that in the rest position it overlaps the fixed panel to form the end wall and which is displaceable simultaneously with the floor and said one side wall between the rest position and the displaced position.

15. A container as claimed in claim 14, which forms an integral part of said vehicle.

16. A container as claimed in claim 14, which is dismountably mountable on said vehicle and includes locking formations configured to cooperate with complementary locking formations on the vehicle to retain the container releasably in position on the vehicle, the container including a power source for operating the displacement means thereby rendering it operable independently of a said vehicle.

* * * * *